May 24, 1960 G. KOLB 2,937,534
PUSH-BUTTON TUNER FOR HIGH-FREQUENCY CIRCUITS
Filed Oct. 25, 1957
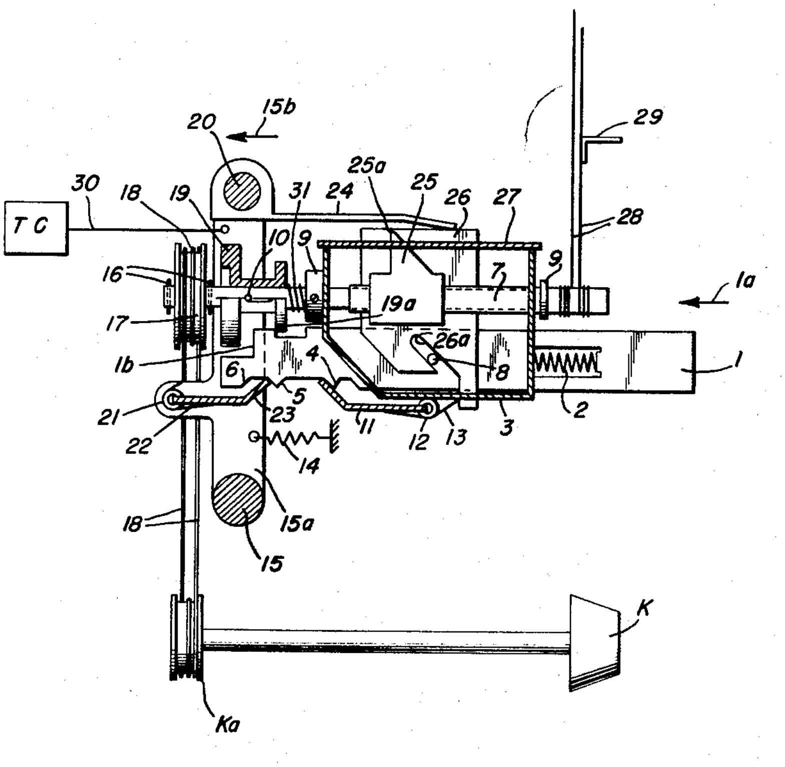
INVENTOR
GEORG KOLB
BY Ralph B. Stewart
ATTORNEY 2,937,534

PUSH-BUTTON TUNER FOR HIGH-FREQUENCY CIRCUITS

Georg Kolb, Stuttgart-Bad Cannstatt, Germany, assignor to Max Grundig, Fuerth, Germany Filed Oct. 25, 1957, Ser. No. 692,451
6 Claims. (Cl. 74—10.27)

In the field of tele-receiving, push-button selectors for selecting pre-determined stations have been known for a long period of time. Apart from methods using motors for adjusting the tuner, two principal methods have been used in the art.

A separate tuner is provided for every station which is tuned in a pure electrical push-button selector. The tuning units customarily are adjusted at the back wall of the apparatus by means of a rotary knob, or they are adjusted at any side by means of tools similar to screw drivers. Apart from that, the expense of the plurality of tuning capacitors and coils is very high if a larger number of push buttons are employed; in addition, there is the disadvantage that switching and changing the tuning capacitors and the coils cause instabilities if the device is used in the range of high frequencies, thereby increasing the expense. Furthermore, the adjustment is not easy for a layman to make because usually no extra dials are provided for those fixed stations. To simplify the use of this system, the proposal was made to associate a dial with every push-button and to connect a mechanical clutch between the tuning button and its associated tuning element, which clutch is operated by the push-button. This method was successful in the past years using means called Duplex-drives. However, it is very difficult to increase the number of fixed stations while using this system, because of the increase in expense. To avoid these difficulties, obviously one may use only one tuning element, which is adjusted to the desired position by moving the button. These systems already have been reduced to practice. In a known system, both the dial indicator and the tuning element jump to the predetermined station when the button is actuated. For adjustment to another station using the same button, the clamp of a limit stop has to be loosened, the dial indicator has to be adjusted to the desired station, and then the clamp has to be fastened again. While the push-button is being actuated, the tuning button has to be declutched through suitable mechanism. The system requires considerable power of the operator because the entire extensive mechanism has to be actuated besides the tuning means. Another disadvantage of the device is that the station associated to the particular button cannot be recognized, unless the button is actuated. Because of the large losses through friction caused by the complicated mechanism, and because of the large mass to be moved, the adjustment of the tuning means depends also upon the velocity of the parts at the moment they approach the stop, which velocity in turn depends upon the variable manual actuation of the push-button.

The purpose of the present invention is to provide a push-button selector avoiding the disadvantages of the known systems but being simple in both electrical and mechanical structure. As mentioned above, pure electrical systems have a highly increasing cost if more than two selections are desired; hence, a mechanical device has to be used. The deficiencies of the hitherto existing mechanical push-button systems are avoided according to the invention by means of the combination of the following elements:

The clamp-means are avoided by adjusting the stops through self-locking screws. Self-locking screws for adjusting stops in push-button systems are known as such. For every stop and so for every station-button, indicating means are provided showing and indicating the position of the stop. Thereby one can readily recognize, before the button is actuated, the position to which the tuning elements are set for this particular button. Besides, the high mechanical energy which hitherto was necessary to move the indicator is not needed. The hitherto required clutch means is avoided by providing a separate clutch for every stop-screw, which clutch connects the associated stop-screw with the tuning knob only if the push-button is pressed. The accuracy of tuning on repeated operation is considerably increased in that the tuning means at first are set into a starting position, during which operation the stop is passed over, and then by means of the force of a spring the tuning means is driven back towards the stop at a velocity independent of any control or influence from the operator.

In the drawing an example of the invention is shown. The tuned circuit controlled by the push-button selector is diagrammatically represented at TC. This circuit contains at least one variable reactance which determines the resonant frequency of the circuit and which is varied by a movable tuning element controlled by the push-button selector. In the example illustrated in the drawing, the movable tuning element comprises a frame formed of parallel rods 15 and 20 connected at their ends by two arms or levers, only one of which is shown at 15*a*. The tuning frame is pivoted to turn about the axis of rod 15, and is normally urged in a clockwise direction by spring 14. The variable reactance in the tuned circuit TC is controlled by movement of the tuning frame through a suitable connection 30 to the upper end of the arm 15*a*.

The tuning frame is moved in a counter-clockwise direction by the selector which includes a plurality of push-buttons 1 shown in the unpressed position and urged into this position by springs 2. They are guided in transverse slots formed in the channel 3 which is connected to a suitable base-plate. After the button has been pressed in the direction of the arrow 1*a*, this button is locked, as known in the art, in a final position or approximately in a fixed position by means of a lock bar 11, which bar is arranged parallel to channel 3 and extends across the shanks of all buttons 1 and serves as a common lock to all buttons. Bar 11 is pressed or biased by means of a spring 13 around the center of a pivot point 12 towards the stop-nose 4 on the shank of each button 1. Spring 13 is in the form of a cylindrical coil mounted on pivot 12, one end of the coil abutting the fixed channel member 3 and the other end bearing against bar 11 to bias its free end against the lower edge of the shank of button 1. When another button is pressed, the previously pressed button is released by the stop-nose 4 which first moves bar 11 downwardly to release the previously pressed button which is returned to unoperated position by its spring 2.

The tuning frame is moved in a counter-clockwise direction by a releasable latch connection between the frame and the push-buttons 1. This connection includes a latch bar 23 extending across all of the push-buttons and being pivotally mounted between the two frame arms on an axis 21 and is urged by a spring 22 against the shanks of the push-buttons and in a position to be engaged by the presser nose 5 of each push-button. When one of the buttons is pressed, the frame arm 15*a* moves in the direction of the arrow 15*b* until the releasing nose 6 of an unpressed button moves the latch bar 23 out of engagement with the nose 5 of the pressed button. The spring 14 now moves the tuning frame in the opposite direction at a speed which is independent of any control by button 1. The movement of the frame in a clockwise direction is arrested at a desired tuning position by an adjustable stop associated with the actuated push-button, as will be explained below.

Associated with each push-button is a screw bolt 7 arranged parallel with the button and journaled in the walls of the channel 3. Screw 7 is held against axial movement by suitable collars 9 carried by the screw on opposite sides of channel 3. Mounted on each screw is a stop nut 25 which is provided with a stop nose 25*a* which extends through and is guided by a slot formed in the channel cover 27, whereby the stop-nut is held against turning with the screw 7. The tuning frame is provided with a number of stop fingers 24, one for each push-button, pivotally supported at one end upon the rod 20 and the free end extending over the channel 3. Each stop finger is biased lightly by gravity or suitable spring in a direction to engage the stop-nose 25*a* on backward movement of the tuning frame. Engagement of the stop-finger 24 with the nose 25*a* is prevented in all cases except for the actuated push-button by means of a guard plate 26 associated with each push-button, the guard plates being mounted for vertical movement within the slots formed in the bottom wall of channel 3 and its cover plate 27. Normally, with button 1 in the rest or unpressed position, plate 26 is held in an upper position with the upper edge thereof above the stop nose 25*a* and prevents the end of finger 24 from engaging the stop nose on its backward movement. Plate 26 is supported upon a pin 8 carried by the shank of button 1 and extending into an inclined slot 26*a* in the plate. When key 1 is pressed inwardly, the pin 8 moving in the inclined slot in plate 26 draws the plate downwardly below the stop nose 25*a* and allows the particular stop finger 24 associated with this push-button to engage the stop-nose 25*a* on the backward movement of the tuning frame. Thus, the tuner is held at a particular tuning position determined by the position of stop-nut 25.

Each adjustable stop 25 may be manually adjusted from the tuning knob K by means of an individual coupling which is rendered operative by actuation of the associated push-button. This coupling includes a clutch disc 19 slidably mounted on the shaft of the screw 7 but held against rotation on the screw shaft by pin 10 carried by the shaft. If the button 1 is pressed, the clutch-disc 19 is pressed against the rope pulley 17 by means of a pressure spring 31, the pulley 17 being rotatably mounted on the end of screw 7 but held against axial shifting by means of stop discs 16. In the rest or unpressed position of the button 1, the clutch disc 19 is moved away from the rope pulley 17 by means of the declutching nose 1*b* of the button engaging clutch flange 19*a*, so that the rope pulley 17 may turn around the screw bolt 7 without turning the bolt. All rope pulleys 17 are connected with each other and they are also connected to the tuning knob K by means of an endless rope 18 passing over all pulleys 17 and over pulley K*a* fixed to the shaft of knob K. By this means all pulleys 17 are turned together with the turning of knob K. If now a clutch disc is coupled in by the pressed button, the coupled screw bolt 7 may be turned by tuning knob K, thereby shifting the self-locking stop-nut 25 along screw 7. By this arrangement, the several stop-nuts associated with the several push-buttons may be adjusted separately to different positions as desired.

Each push-button is provided with an indicator in the form of an indicator pointer or index 29 mounted on a rope 28 wound around the front end portion of the shaft of screw 7 and cooperating with a suitable scale to indicate the position of the stop-nut 25 mounted on the screw.

The operation of the selector may be summarized as follows:

Upon pressing a push-button, the tuning frame arm 15*a* is rotated in the direction of the arrow 15*b* through the latch bar 23 engaging the presser nose 5 of the push-button shank. This initial movement is the same for all push-buttons, and the tuning frame shifts the tuning of the circuit TC to a frequency at one end of the tuning range. After the button has moved far enough for the lock bar 11 to engage the stop-nose 4, the latch bar 23 is released from the nose 5 by engagement of the latch bar with the release nose 6 of an unpressed button. The tuning frame is then free to move clockwise under the influence of spring 14. This action takes place at the same point in the cycle of operation for each push-button. As the push-button moves forward into the locked position, the guard plate 26 is moved downwardly by pin 8, so that, upon backward movement of the tuning frame, the stop finger 24 will engage the stop-nose 25*a* to arrest the tuning frame and hold the tuning elements at a predetermined position determined by the position of the stop-nut 25. It will be noted that for each operation of a particular push-button, the tuning frame is returned from its starting position into engagement with the stop-nose 25*a* under the invariable action of spring 14, so that the moving parts are brought to a stop under the same conditions on repeated operation and is not subject to variation depending upon the speed of operation of the push-button. Since the stop finger 24 engages the stop-nose 25*a* under the loading of spring 14, all lost motion or play because of mechanical inaccuracies is avoided. Elements 1, 2, 4, 5, 6, 7, 8, 9, 10, 16, 17, 19, 24, 25, 26, 28, 29, 31 are required once for every push-button. The parts 3, 11, 12, 13, 14, 15, 18, 20, 21, 22, 23, 27, 30, K and K*a* are required only once.

I claim:

1. A push-button selector for high-frequency tuning apparatus comprising, a movable tuner member mounted for movement between a starting position at one end of the tuning range and a second position at the other end of the tuning range, spring means normally biasing said movable member towards said second position, a push-button mounted to move from a rest position into a locked position, means for moving said member against the action of said spring means upon movement of said push-button towards locked position, means rendered operative upon said member reaching said starting position to release said member from said moving means so that said member moves back toward said second position under the action of said spring means, an adjustable stop for arresting backward movement of said movable member at an intermediate position and secured against movement in the direction of movement of the movable member, means to normally render the stop ineffective to arrest backward movement of the movable member, and means controlled by said push-button in its locked position for rendering said stop effective.

2. A push-button selector for high-frequency tuning apparatus comprising, a movable tuner member mounted for movement between a starting position at one end of the tuning range and a second position at the other end of the tuning range, spring means normally biasing said movable member towards said second position, a plurality of push-buttons each mounted to move from a rest position to a locked position, means for moving said member against the action of said spring means upon movement of any push-button towards locked position, means rendered operative upon said member reaching said starting position to release said member from the moving means so that said member moves back toward said second position under the action of said spring, an adjustable stop for each push-button arranged to arrest backward movement of said movable member at an intermediate position and secured against movement in the direction of movement of the movable member, means to normally render the stops ineffective to arrest backward movement of the movable member, and means controlled by each push-button in its locked position for rendering its associated stop effective in arresting said movable tuner member.

3. A push-button selector according to claim 2, wherein said adjustable stops comprise adjustable abutments arranged in the paths of movement of resilient fingers carried by said movable tuner member, and said means for normally rendering said adjustable stops ineffective comprise a guard plate for each abutment normally positioned to hold the associated resilient finger out of contact with the abutment, and means controlled by the movement of the push-button into locked position for retracting said guard plate.

4. A push-button selector according to claim 2, wherein said adjustable stops comprise nuts carried on self-locking screws, and indicator means controlled by each screw for indicating the position of the stops.

5. A push-button selector according to claim 4, and including a normally open clutch for coupling each self-locking screw to a common tuner knob, and means controlled by the operation of any push-button into locked position for moving the corresponding clutch into operative position.

6. A push-button selector according to claim 2, wherein said means for moving said movable tuner member into starting position comprises a latch-bar pivotally mounted on said movable member and normally positioned in the path of travel of a presser nose carried by the shank of each push-button, and means rendered operative upon movement of any push-button into locked position for disengaging said latch-bar from the presser nose of the actuated push-button.

References Cited in the file of this patent

UNITED STATES PATENTS

| | | |
|---|---|---|
| 2,307,285 | Mastney | Jan. 5, 1943 |
| 2,340,393 | Leishman | Feb. 1, 1944 |
| 2,494,008 | Schwarz et al. | Jan. 10, 1950 |
| 2,533,477 | Laschenski | Dec. 12, 1950 |
| 2,554,052 | Hansen | May 22, 1951 |
| 2,770,137 | Sacre | Nov. 13, 1956 |